United States Patent [19]

Miki et al.

[11] 4,089,913

[45] *May 16, 1978

[54] PROCESS FOR PRODUCING TRANSPARENT BLOCK COPOLYMER RESIN

[75] Inventors: Tamotsu Miki; Shizuo Narisawa; Ichiro Ichikawa; Hideki Horiike, all of Ichihara, Japan

[73] Assignee: Sumitomo Chemical Company, Limited, Osaka, Japan

[*] Notice: The portion of the term of this patent subsequent to Oct. 18, 1994, has been disclaimed.

[21] Appl. No.: 662,019

[22] Filed: Feb. 27, 1976

Related U.S. Application Data

[63] Continuation of Ser. No. 538,409, Jan. 3, 1975, abandoned.

[30] Foreign Application Priority Data

Jan. 10, 1974 Japan .................................... 49-6370
Jun. 8, 1974 Japan ................................... 49-65148

[51] Int. Cl.² ............................................ C08F 297/04
[52] U.S. Cl. .................................................. 260/880 B
[58] Field of Search ..................................... 260/880 B

[56] References Cited

U.S. PATENT DOCUMENTS

| | | |
|---|---|---|
| 3,251,905 | 5/1966 | Zelinski ............................ 260/880 B |
| 3,402,159 | 9/1968 | Hsieh ............................... 260/880 B |
| 3,778,490 | 12/1973 | Hsieh ............................... 260/880 B |
| 3,853,978 | 12/1974 | Horiie .............................. 260/880 B |
| 3,872,068 | 3/1975 | Horiie .............................. 260/880 B |

*Primary Examiner*—Paul R. Michl
*Attorney, Agent, or Firm*—Farrell R. Werbow

[57] ABSTRACT

In block-copolymerizing a vinyl aromatic compound and a conjugated diene in a hydrocarbon solvent using an organolithium compound as initiator, a transparent block copolymer resin characterized by having elastomeric random copolymer blocks may be produced by continuously adding a mixture of the vinyl aromatic compound and the conjugated diene. The block copolymer resin thus obtained is transparent, excellent in mechanical characteristics and may be used in the fields of sheetings, films, and various molded articles.

27 Claims, No Drawings

PROCESS FOR PRODUCING TRANSPARENT BLOCK COPOLYMER RESIN

This is a continuation of application Ser. No. 538,409, filed Jan. 3, 1975, now abandoned.

This invention relates to a process for producing a novel block copolymer resin which is transparent and excellent in mechanical properties, particularly in elongation and impact strength. More particularly, it relates to a novel process for producing a block copolymer resin which is transparent and excellent in mechanical properties by block-copolymerizing in a specified manner a vinyl aromatic compound monomer and a conjugated diene monomer in a hydrocarbon solvent using an organolithium compound as initiator.

It has been known that various block copolymers of different structures can be obtained by copolymerizing vinyl aromatic compounds and conjugated dienes with an alkali metal or an organo-alkali-metal compound used as initiator. For example, in Japanese Patent Publication Nos. 19,286/61 and 2,423/73, are described processes for producing a transparent resin from styrene, butadiene, and the like, by two-stage block copolymerization; in Japanese Patent Publication Nos. 3,252/72 and 28,915/72, are disclosed processes for producing a transparent resin by adding each of the monomers alternately in four or five stages; in Japanese Patent Publication No. 20,038/73, German Patent Application Laid-open (Offenlegungsschrift) No. 2,120,232, and Japanese Patent Application Laid-open (kokai) No. 7,597/71, are proposed processes for producing a transparent resin by single stage polymerization using the same monomers as mentioned above.

These processes generally employ as the polymerization initiator an organolithium compound known as one-end initiation type or that known as both-ends initiation type. In either case, the process is characterized by forming in the polymer molecule a plastic block composed chiefly of a vinyl aromatic compound polymer and an elastomeric block composed chiefly of a conjugated diene polymer by means of a living anionic polymerization technique. It has been known, however, that when the elastomeric block is composed of a homopolymer of a conjugated diene alone, the block copolymer obtained is unsatisfactory for practical use in elongation, impact strength, and flexural strength among mechanical properties (the afore-cited Japanese Patent Publication No. 19,286/61, Example 11; Japanese Patent Publication No. 2,423/73), giving rise to disadvantages of the copolymer in practical application as a resin. On the other hand, in the processes where a monomer mixture is added all at once [the afore-cited Japanese Patent Application Laid-open (Kokai) No. 7,597/71; German Patent Application Laid-open (Offenlegungsschrift) No. 2,120,232; Japanese Patent Publication No. 20,038/73], there is always formed a copolymer block between the plastic block composed chiefly of a vinyl aromatic compound polymer and the elastomeric block composed chiefly of a conjugated diene polymer, owing to the difference in monomer reactivities. In this case, however, a technical difficulty is encountered in removing a large quantity of heat evolved from the polymerization of monomers which have been added all at once. Such a difficulty would be deterrent to the commercialization of the process.

The present inventors had conducted extensive investigations to develop a process for producing a transparent resin of excellent mechanical properties from a vinyl aromatic compound monomer and a conjugated diene monomer as starting materials. As a result, it was found that the above object can be achieved by an anionic living polymerization process using an organolithium compound as initiator, which process comprises selecting a specified combination of the methods of addition of monomers so as to form a copolymer molecule having at least one plastic block composed of a vinyl aromatic compound homopolymer and at least one elastomeric block composed of a random copolymer of a vinyl aromatic compound and a conjugated diene. Based on the finding, the present invention has been accomplished.

An object of the present invention is to provide novel block copolymer resins produced from a vinyl aromatic compound monomer and a conjugated diene monomer as starting materials and a process for producing same.

Other object of the present invention is to provide novel block copolymer resins which are transparent, excellent in mechanical properties and in addition have good processability.

Further objects and advantages of the present invention are will be apparent from the description below.

The present invention provides a process for producing a transparent block copolymer resin, which comprises the following four essential features in block-copolymerizing in a hydrocarbon solvent 90 to 65 parts by weight of a vinyl aromatic compound monomer and 10 to 35 parts by weight of a conjugated diene monomer by using an organolithium compound as initiator: (1) formation of a block copolymer having in a molecule at least one plastic block composed of a vinyl aromatic compound homopolymer and at least one elastomeric block composed of a random copolymer of a vinyl aromatic compound and a conjugated diene; (2) formation of the homopolymer block with 50 to 90% by weight of the vinyl aromatic compound monomer and formation of the random copolymer block by adding continuously a monomer mixture of a fixed composition comprising the vinyl aromatic compound and the conjugated diene in a weight ratio from 0.1 to 3.0; (3) formation of the block copolymer so as to have a mean molecular weight of 0.35 to 1.8 dl/g in terms of intrinsic viscosity as measured in toluene at 30° C; and (4) polymerization in the presence or absence of 0.01 to 5 mole-% based on the total monomer of a Lewis base compound. The process of this invention presents no particular difficulty in commercialization. The block copolymer resin thus produced is characterized by transparency, excellent mechanical properties, particularly high impact strength, little clouding under bending stress, and, in addition, good processability, permitting the resin to be used for general purpose.

The process of this invention is disclosed below in further detail.

The vinyl aromatic compounds for use in this invention are sytrene, α-methylstyrene, vinylnaphthalene, and nucleus-substituted styrenes such as vinyltoluene, or mixtures of these. The conjugated dienes for use are 1,3-butadiene and substituted butadienes such as isoprene, piperylene, 2,3-dimethyl-1,3-butadiene, and 1-phenyl-1,3-butadiene, or mixtures of these. Particularly preferred are styrene among the vinyl aromatic compounds and 1,3-butadiene among the conjugated dienes, in view of availability and effectiveness.

The weight ratio of monomers for use in this invention is 90 to 65 parts by weight of a vinyl aromatic compound to 10 to 35 parts by weight of a conjugated diene. When more than 90 parts by weight of a vinyl aromatic compound is used, the elongation and impact strength among mechanical properties of the resin become decreased, while when less than 65 parts by weight of the compound is used, the tensile strength and the processability both become undesirably deteriorated. In the present process, at least one homopolymer block is formed in a molecule from the vinyl aromatic compound monomer and 50 to 90% by weight of the monomer is used in forming such blocks.

The hydrocarbon solvents to be used in the present process are aromatic hydrocarbons such as benzene, toluene, xylene, and ethylbenzene; aliphatic hydrocarbons such as hexane, heptane, and the like; and cycloaliphatic hydrocarbons such as cyclopentane, cyclohexane, and methylcyclohexane. These are inert and used each alone or in mixtures of two or more. The amount to be used of these hydrocarbon solvents is generally 1 to 20 parts by weight for 1 part by weight of the total monomer. Before use, these solvents and the monomers should be thoroughly freed from such substances as water, oxygen, carbon dioxide, some sulfur compounds, and acetylenes, which will destroy the initiators used in the present process and the active terminals of the growing polymer. As one mode of carrying out this invention, it is also possible to obtain the block copolymer not only in solution but also in suspension in a solvent, by properly selecting the order of addition of solvents and monomers.

The organolithium compounds to be used as initiator in the present process are those generally known as one-end initiation type or both-ends initiation type. Examples of individual compounds include ethyllithium, propyllithium, butyllithium, amyllitium, trimethylenedilithium, tetramethylenedilithium, hexyllithium, cyclohexyllithium, phenyllithium, tolyllithium, naphthyllithium, and, in addition, a lithium complex with a condensed- or non-condensed-ring aromatic compound, such as for example, naphthalene, stilbene, or biphenyl and a living oligobutadienyldilithium or oligoisoprenyldilithium. These can be used each alone or in mixtures of two or more. The amount to be used of these organolithium compounds is generally 0.002 to 5 mole-%, preferably 0.005 to 1.5 mole-% based on total monomer.

In the present process, at least one random copolymer block is formed in the molecule from a vinyl aromatic compound and a conjugated diene. In this step, in order to allow the random copolymerization to proceed smoothly, a specified amount of a Lewis base compound such as an ether compound or a tertiary amine compound can be used. Examples of such ether compounds are cyclic ethers such as tetrahydrofuran and tetrahydropyrane; aliphatic monoethers such as diethyl ether and dibutyl ether; and aliphatic polyethers such as diethylene glycol dimethyl ether and diethylene glycol diethyl ether. Examples of the tertiary amine compounds are triethylamine, tripropylamine, tributylamine, and, in addition, such compounds as N,N'-dimethylaniline, pyridine, and quinoline. When such a Lewis base compound is used, the amount to be used is 0.01 to 5 mole-%, preferably 0.05 to 2 mole-%, based on total monomer. It is undesirable to use the Lewis base compound in excess of the said upper limit, because then the content of vinyl-bond in the random copolymer block formed from a vinyl aromatic compound and a conjugated diene becomes so high that the mechanical properties of resin become markedly deteriorated, particularly at low temperatures. The Lewis base compound can be added at any time, with no particular restriction, before the step of forming the copolymer block.

In the process of this invention, a vinyl aromatic compound monomer and a conjugated diene monomer are block-copolymerized in the presence of an organolithium compound. The block copolymer molecule thus formed should contain at least one homopolymer block of the vinyl aromatic compound and at least one block of a random copolymer block of the vinyl aromatic compound and the conjugated diene. In the process of this invention, moreover, 50 to 90% by weight of the vinyl aromatic compound monomer is used to form the vinyl aromatic compound homopolymer block.

A block copolymer of such a structure that the amount of a vinyl aromatic compound used in forming the homopolymer block is less than 50% by weight of the total vinyl aromatic compound, particularly said amount is zero, is undesirable because of defective mechanical properties, particularly defective tensile strength and hardness. On the other hand, a block copolymer of such a structure that more than 90%, particularly 100%, by weight of the vinyl aromatic compound are used to form the homopolymer block can no more be called a useful resin, because of inferior mechanical properties, particularly inferior elongation, inferior impact strength and a high clouding under bending stress. In a block copolymer having two or more homopolymer blocks in a molecule, the sum of vinyl aromatic monomer used in each homopolymer block should be 50 to 90% by weight of the total vinyl aromatic monomer.

Further, in the present process, in order to form the aforesaid random copolymer block, there is adopted a method in which a monomer mixture of a fixed composition comprising the vinyl aromatic compound and the conjugated diene in a weight ratio from 0.1 to 3.0 is continuously added. If the ratio between the vinyl aromatic compound and the conjugated diene is below the lower limit of the above-noted range, the impact strength among mechanical properties of the block copolymer resin formed becomes decreased and the clouding under bending stress becomes increased, while if the ratio is above the upper limit, the tensile strength and hardness of the block copolymer resin formed become inferior, both cases being undesirable. In the case of a block copolymer having two or more random copolymer blocks of the vinyl aromatic compound and the conjugated diene in a molecule, it is necessary to maintain the ratio between the vinyl aromatic compound and the conjugated diene within the above-said range from 0.1 to 3.0 in each of the copolymer blocks and also in copolymer blocks as a whole; the said fixed ratio in each of the copolymer blocks may be either the same or different within the said range so long as the above-mentioned conditions are satisfied.

In forming the random copolymer block by continuously feeding a vinyl aromatic compound and a conjugated diene, both monomers can be fed either in a mixture or separately to the polymerization system, while maintaining a fixed monomer ratio within the aforesaid range. In either case, it is necessary to feed the vinyl aromatic compound and the conjugated diene, in a fixed ratio, continuously to the polymerization system under such conditions of temperature and feeding rate that both monomers will not accumulate in the system. It is also feasible to feed the vinyl aromatic compound and the conjugated diene, while maintaining the fixed monomer ratio, semi-consecutively to the polymerization system in a manner substantially approximating the continuous feeding. The above-said continuous feeding is one of the characteristic features of the present process, which allows effective removal of a large quantity of heat generated from the polymerization reaction when carried out commercially and, moreover, preventing side reactions such as gelation accompanying the heat generation.

Although the block copolymer formed by the present process has no restriction placed on its structure so long as the conditions mentioned in the foregoing are satisfied, examples of particularly preferred structures are given below, wherein $S_1$, $S_2$ and $S_3$ represent homopolymer blocks of a vinyl aromatic compound and $(S/B)_1$ and $(S/B)_2$ represent copolymer blocks of a vinyl aromatic compound and a conjugated diene.

1) $S_1 - (S/B)_1$
2) $S_1 - (S/B)_1 - S_1$
3) $S_1 - (S/B)_1 - S_2$
4) $S_1 - (S/B)_1 - (S/B)_2 - S_2$
5) $S_1 - (S/B)_1 - S_2 - (S/B)_2$
6) $S_1 - (S/B)_1 - S_2 - (S/B)_2 - S_3$
7) $S_1 - (S/B)_1 - (S/B)_2 - (S/B)_1 - S_1$

The process of this invention is carried out by the method of multistage polymerization. In each stage, addition of the monomer may be conducted at any time after the conversion in the preceding stage has reached practically 100%. In the present process, it is possible to obtain an overall conversion of substantially 100%.

In the present process, the mean molecular weight of copolymer resin formed is regulated by the quantity of an initiator used. According to this invention, the block copolymer resin should have a mean molecular weight of 0.35 to 1.8 dl/g in terms of intrinsic viscosity, $[\eta]$, as measured in toluene solvent at 30° C. A block copolymer resin of low molecular weight having an intrinsic viscosity below 0.35 dl/g is undesirable because of decreased mechanical properties. On the other hand, a resin of excessively high molecular weight having an intrinsic viscosity exceeding 1.8 dl/g is also undesirable because of deteriorated transparency and processability.

The polymerization according to this invention is carried out at −20° C to 150° C, preferably 20° C to 120° C. The pressure is selected from those which are sufficient to keep the monomer and solvent in liquid phase at the polymerization temperature. The sufficient polymerization time is 1 to 48 hours, usually 2 to 24 hours, though depending on polymerization conditions.

After the polymerization is completed, to the polymerization mixture, is added sufficient amount of water, methanol, or isopropanol to deactivate the active end of the polymer and the residual initiator, then, if necessary, a small amount of an antioxidant such as, for example, 4-methyl-2,6-di-tert-butylphenol, and thereafter an excess of methanol or isopropanol to precipitate and recover the polymer. An alternative procedure is to recover the polymer by directly heating the polymerization mixture to dryness or by contacting the polymerization mixture with steam to remove the solvent by distillation.

The block copolymer obtained according to this invention may be processed by customary methods and used in the fields where conventional resins have been used. The copolymer can also be compounded in a known manner with conventional stabilizers, reinforcing agents, fillers, and various other additives.

As mentioned in the foregoing, the present invention provides a novel process for producing a transparent copolymer resin with excellent mechanical properties from 90 to 65 parts by weight of a vinyl aromatic compound monomer and 10 to 35 parts by weight of a conjugated diene monomer, both used as starting materials, by adding to the polymerization system said monomers in specified sequence and in specified combinations using an organolithium compound as initiator. The present process may be easily carried out on a commercial scale and the resin obtained is characterized by excellent transparency and excellent mechanical properties so that it can be used even in the field where conventional resins could not be used with satisfactory results.

The invention is illustrated below with reference to Examples, but the invention is not limited by the Examples.

EXAMPLE 1

Into a 2.5-liter glass autoclave, after having been flushed with argon to replace the air, were charged 1.5 liters of purified, dried and deaerated cyclohexane, 0.9 g of tetrahydrofuran, and 250 g of purified and dried sytrane. Into the autoclave was added dropwise a n-butyllithium solution in hexane until orange color characteristic of the polystyryllithium active end appeared (which corresponded to 2.1 millimoles) and then followed by 4.0 millimoles of n-butyllithium. The temperature of the autoclave was elevated to 60° C and stirring was continued for 3 hours. A monomer mixture comprising 150 g of sytrene and 100 g of purified and dried 1,3-butadiene was added under an argon pressure into the autoclave over a period of 2 hours at a constant rate to continue the polymerization at 60° C. After further 2 hours of polymerization, 50 ml of methanol was added to the polymerization system to terminate the polymerization. The resulting polymerization mixture was poured into methanol containing 4-methyl-2,6-di-tert-butylphenol as an antioxidant, to precipitate the polymerizate. The precipitated polymerizate was collected by filtration and dried in vacuo to obtain a copolymer in a yield of 99.4%. The copolymer had an intrinsic viscosity, $[\eta]$, of 0.84 dl/g, as measured in toluene at 30° C. To 100 parts by weight of the copolymer, was added an antioxidant mixture comprising 0.5 part by weight of 4-methyl-2,6-di-tert-butylphenol and 0.5 part by weight of tris-(nonylphenyl) phosphite. The mixture was pelletized by means of an extruder and the resulting pellets were injection-molded to prepare specimens for testing physical properties. The molded specimen showed beautiful appearance and was highly transparent. The results of tests for physical properties conducted on the moded specimens were as shown in Table 1.

Table 1

| | |
|---|---|
| Intrinsic viscosity [1] (dl/g) | 0.84 |
| Melt index [2] (g/10 minutes) | 0.09 |
| Tensile strength [3] (kg/cm$^2$) | 312 |
| Elongation [3] (%) | 159 |
| Izod impact strength [4] (kg · cm/cm$^2$) | |
|     notched | 2.2 |
|     unnotched | 25.4 |

Table 1-continued

| | |
|---|---|
| Haze value [5] (%) | 6.0 |

Note:
[1] Measured in toluene at 30° C by means of an Ubbelohde viscometer on the copolymer before being pelletized.
[2] Measured according to the method of JIS K 6760.
[3] Measured according to the method of JIS K 6871, at 20° C, tensile rate being 5 mm/min.
[4] Measured at 20° C according to the method of JIS K 6871.
[5] Measured according to the method of ASTM D 1003.

EXAMPLE 2

Polymerization was carried out by using the same autoclave as in Example 1 and in the same manner as in Example 1, except that the monomer charge was as shown below. The initiator used was 5.0 millimoles of n-butyllithium and 0.9 g of tetrahydrofuran was added.

| | | |
|---|---|---|
| First stage monomer : | styrene | 125 g |
| Second stage monomer: | | |
| styrene | | 125 g |
| 1,3-butadiene | | 125 g  } Mixture |
| Third stage monomer : | styrene | 125 g |

The first stage polymerization was conducted for 2 hours. In the second stage, the monomer mixture was added at a constant rate over a period of 2 hours and the polymerization was continued for another 2 hours. In the third stage, polymerization was conducted for further 2 hours after addition of the monomer. The polymerization was terminated after 8 hours of polymerization in total. The polymerizate was treated in a manner similar to that in Example 1 to obtain a copolymer in a yield of 99.8%. The physical properties of the copolymer measured in the same manner as in Example 1 were as shown in Table 2.

Table 2

| | |
|---|---|
| Intrinsic viscosity (dl/g) | 0.70 |
| Melt index (g/10 min.) | 2.1 |
| Tensile strength (kg/cm²) | |
| Yield point. | 140 |
| Break point | 220 |
| Elongation (%) | 260 |
| Izod impact strength (kg · cm/cm²) unnotched | > 100 |
| Haze value (%) | 8.0 |

EXAMPLES 3 to 7

Polymerization was carried out in the same manner as in Example 2, except that the monomer combinations were as shown in Table 3. As a Lewis base compound, each 0.9 g of tetrahydrofuran was used.

Table 3

| Example No. | First stage monomer | Second stage monomer | | Third stage monomer | Remark |
|---|---|---|---|---|---|
| 3 | Styrene 150 g | Styrene<br>1,3-Butadiene | 112.5 g<br>87.5 g | Styrene 150 g | Duration of addn. in 2nd. stage: 1 hour |
| 4 | Styrene 150 g | Styrene<br>1,3-Butadiene | 100 g<br>100 g | Styrene 150 g | Duration of addn. in 2nd. stage : 2 hours |
| 5 | Styrene 150 g | Styrene<br>1,3-Butadiene | 75 g<br>125 g | Styrene 150 g | " |
| 6 | Styrene 125 g | Styrene<br>1,3-Butadiene | 112.5 g<br>137.5 g | Styrene 125 g | Duration of addn. in 2nd. stage: 3 hours |
| 7 | Styrene 150 g | Styrene<br>1,3-Butadiene | 50 g<br>150 g | Styrene 150 g | " |

Physical properties of the copolymers after having been treated in the same manner as in Example 1 were as shown in Table 4.

Table 4

| Example No. | Intrinsic viscosity (dl/g) | Tensile strength (kg/cm²) Yield point | Tensile strength (kg/cm²) Break point | Elongation (%) | Izod impact strength, unnotched (kg · cm/cm²) | Transparency |
|---|---|---|---|---|---|---|
| 3 | 1.02 | 310 | 290 | 115 | > 100 | Transparent |
| 4 | 1.03 | 213 | 275 | 190 | > 100 | " |
| 5 | 1.01 | 236 | 254 | 148 | > 100 | " |
| 6 | 0.86 | 227 | 198 | 247 | 34.9 | " |
| 7 | 1.17 | 231 | 254 | 184 | > 100 | " |

EXAMPLE 8

In a manner similar to that in Example 2, four-stage polymerization was carried out by using the same apparatus as in Example 1 and a monomer combination shown below.

| | | |
|---|---|---|
| First stage monomer : | styrene | 125 g |
| Second stage monomer: | | |
| styrene | | 105 g  } mixture |
| 1,3-butadiene | | 75 g |
| Third stage monomer : | | |
| styrene | | 20 g  } mixture |
| 1,3-butadiene | | 50 g |
| Fourth stage monomer: | styrene | 125 g |

Duration of monomer addition and polymerization period were as follows:

| | |
|---|---|
| First stage, polymerization period : | 2 hours |
| Second stage, | |
| Duration of monomer addition : | 2 hours |
| Polymerization period after addition of monomer : | 2 hours |
| Third stage, | |
| Duration of monomer addition : | 1 hour |
| Polymerization period after addition of monomer : | 1 hour |
| Fourth stage, polymerization period: | 2 hours |

Physical properties of the copolymer after having been treated in the same manner as in Example 1 were as shown in Table 5.

Table 5

| | |
|---|---|
| Intrinsic viscosity (dl/g) | 0.61 |
| Melt index (g/10 minutes) | 7.9 |
| Tensile strength (kg/cm²) | |
| Yield point | 127 |
| Break point | 202 |

Table 5-continued

| | |
|---|---|
| Elongation (%) | 293 |
| Izod impact strength (kg · cm/cm²) unnotched | >100 |
| Haze value (%) | 7.5 |

COMPARATIVE EXAMPLES 1 TO 4

Polymerization was carried out in the same manner as in Example 2, except that the combinations of the monomer with the Lewis base compound were as shown in Table 6.

Table 6

| Comparative Example No. | First stage monomer | Second stage monomer | | Third stage monomer | Lewis base compound | Duration of monomer addn. in 2nd. stage |
|---|---|---|---|---|---|---|
| 1 | Styrene 200 g | 1,3-Butadiene | 100 g | Styrene 200 g | — | 2 hours |
| 2 | Styrene 200 g | 1,3-Butadiene | 100 g | Styrene 200 g | Tetrahydrofuran 0.9 g | 2 hours |
| 3 | Styrene 150 g | Styrene 1,3-Butadiene | 100 g 100 g | Styrene 150 g | — | Added all at a time |
| 4 | Styrene 150 g | Styrene 1,3-Butadiene | 100 g 100 g | Styrene 150 g | Tetrahydrofuran 0.9 g | Added all at a time |

As for the mode of polymerization, in Comparative Examples No. 1 and No. 2, only 1,3-butadiene was used in the second stage and it was added at a constant rate over a period of 2 hours, whereas in Comparative Examples No. 3 and No. 4, a mixture of styrene and 1,3-butadiene was added all at a time, resulting in pronounced evolution of the heat of polymerization; in Comparative Example No. 4, polymerization temperature became uncontrollable and reached a temperature as high as about 90° C.

Physical properties of the copolymers after having been treated in the same manner as in Example 1 were as shown in Table 7.

Table 7

| Comparative Example No. | Intrinsic viscosity (dl/g) | Tensile strength (kg/cm²) | Elongation (%) | Izod impact strength (unnotched) (kg·cm/cm²) | Transparency |
|---|---|---|---|---|---|
| 1 | 0.72 | 334 | 12 | 13.0 | Transparent |
| 2 | 0.78 | 330 | 16 | 12.5 | " |
| 3 | 0.85 | 310 | 45 | 15.5 | " |
| 4 | 0.72 | 302 | 195 | 25.5 | " |

As is apparent from the results obtained in Comparative Examples 1 and 2, physical properties of the resulting copolymer were inferior when only 1,3-butadiene was polymerized in the second stage. Similar results were obtained even when a mixture of styrene and 1,3-butadiene was added in the second stage, provided that the a Lewis base compound was absent, as in Comparative Example 3. On the other hand, when a mixture of styrene and 1,3-butadiene was added all at a time in the presence of a Lewis base compound, as in Comparative Example 4, the polymerization temperature became uncontrollable, as stated above, on account of the heat of polymerization and the physical properties of the copolymer were different from those obtained in Example 4 in Izod impact strength. Example 9

Into a 2.5-liter glass autoclave, after having been flushed with argon to replace the air, were charged 1.5 liters of cyclohexane and 150 g of styrene, both of which had been purified, dried, and deaerated. Into the stirred autoclave, was added dropwise n-butyllithium, diluted with n-hexane solvent to a predetermined concentration, until faint orange color is developed in the mixture (which corresponded to 0.9 millimole) and then followed by further 6.5 millimoles of n-butyllithium as initiator. The temperature of the autoclave was elevated to 100° C and stirring was continued for 1 hour. A monomer mixture comprising 100 g of styrene and 100 g of purified and dried 1,3-butadiene was added under an argon pressure continuously into the polymerization system at a constant rate over a period of 3 hours. After the addition, stirring was continued for 30 minutes. Then, to the mixture was added further 150 g of styrene and allowed to polymerize at 100° C for 1 hour. Then, 50 ml of methanol was added to terminate the polymerization. The resulting polymerization mixture was poured into methanol containing 4-methyl-2,6-di-tert-butylphenol as antioxidant, to precipitate the polymerizate. The polymerizate was collected by filtration and dried in vacuo to obtain a copolymer in a yield of 99.7%. The copolymer had an intrinsic viscosity, [η], of 0.64 dl/g as measured in toluene at 30° C. To 100 parts by weight of the copolymer, was added an antioxidant mixture comprising 0.5 part by weight of 4-methyl-2,6-di-tert-butylphenol and 0.5 part by weight of tris-(nonylphenyl) phosphite. The resulting mixture was pelletized by means of an extruder and the resulting pellets were injection-molded to prepare specimens for testing physical properties. The molded specimen showed beautiful appearance and was highly transparent. The results of tests for physical properties conducted on the molded specimens were as shown in Table 8.

Table 8

| | |
|---|---|
| Intrinsic viscosity [1] (dl/g) | 0.64 |
| Melt index [2] (g/10 min.) | 1.99 |
| Tensile strength [3] (kg/cm²) | 263 |
| Elongation [3] (%) | 279 |
| Izod impact strength, unnotched [4] (kg·cm/cm²) | > 100 |
| Clouding under bending stress [5] (mm) | 2.8 |

Note :
[1] Measured in toluene at 30° C by means of an Ubbelohde viscometer on the copolymer before being pelletized.
[2] Measured according to the method of JIS K 6760.
[3] Measured according to the method of JIS K 6871, at 20° C, tensile rate being 5 mm/min.
[4] Measured according to the method of JIS K 6871, at 20° C on an unnotched specimen.
[5] A specimen, 38 mm × 13 mm, was cut out of a press-molded sheet, 1 mm in thickness, and annealed at 80° C for 3 hours. The annealed specimen, without incision, was mounted on a holder specified in JIS Z 1703, left standing in the air at room temperature for 24 hours, and the distance between cracks developed under bending stress was measured.

In order to confirm that the copolymer block formed by feeding a mixture of styrene and 1,3-butadiene in the second stage of polymerization in Example 9 is really a substantially random copolymer, the following experiment was conducted. Under the same conditions as in Example 1, a mixture comprising 100 g of styrene and 100 g of 1,3-butadiene was added at a uniform rate into a 2.5-liter pressure reactor containing 1.5 liters of cyclohexane and 6.5 millimoles of n-butyllithium and samples were withdrawn at regular intervals during polymerization to determine the styrene-1,3-butadiene ratio in the polymer. The results obtained were as shown in Table 9.

and durations of continuous addition of a styrene-1,3-butadiene mixture in the second stage were as shown in Table 10.

Table 10

| Example No. | First stage monomer (g) | Second stage monomer (g) | | Third stage monomer (g) | Duration of addn. of monomer in 2nd. stage (hour) |
|---|---|---|---|---|---|
| 10 | Styrene 300 | Styrene | 100 | — | 3 |
|    |             | 1,3-Butadiene | 100 | | |
| 11 | Styrene 125 | Styrene | 125 | Styrene 125 | 4 |
|    |             | 1,3-Butadiene | 125 | | |
| 12 | Styrene 150 | Styrene | 75 | Styrene 150 | 3 |
|    |             | 1,3-Butadiene | 125 | | |

Physical properties of the copolymers after having been treated in the same manner as in Example 9 were as shown in Table 11.

Table 11

| Example No. | Intrinsic viscosity (d/g) | Melt index (g/10 min.) | Tensile strength (kg/cm²) | Elongation (%) | Izod impact strength (unnotched) (kg·cm/cm²) | Clouding under bending stress (mm) |
|---|---|---|---|---|---|---|
| 10 | 0.74 | 1.86 | 292 | 126 | 50.0 | 3.6 |
| 11 | 0.61 | 4.78 | 200 | 357 | > 100 | 0 |
| 12 | 0.61 | 2.12 | 244 | 427 | > 100 | 3.2 |

Table 9

| Sample No. | Time of sampling (hour) | Conversion (%) | Refractive index ($n_D^{30°C}$) | Polystyrene block [1] (%) |
|---|---|---|---|---|
| 1 | 0.5 | 15.1 | 1.5505 | 0 |
| 2 | 1.0 | 31.8 | 1.5525 | 0 |
| 3 | 1.5 | 49.0 | 1.5540 | 0 |
| 4 | 2.0 | 64.8 | 1.5547 | 0 |
| 5 | 2.5 | 82.3 | 1.5551 | 0 |
| 6 | 3.0 | 99.2 | 1.5550 | 0 |
| 7 | 3.25 | 100.1 | 1.5552 | 0 |
| 8 | 3.5 | 100.3 | 1.5549 | 0 |
| 9 | 4.0 | 100.1 | 1.5550 | 0 |

Note:

[1] By oxidative decomposition. It was found that the styrene-1,3-butadiene copolymer block formed in Example 9 is a substantially random copolymer, as evidenced by the fact that the monomer ratio by weight in the styrene-1,3-butadiene copolymer block remained practically constant at 1 : 1 independent of conversion as estimated from the refractive index and that no polystyrene block was formed.

EXAMPLES 10 TO 12

Polymerization was carried out in the same manner as in Example 9, except that the monomer combinations

EXAMPLES 13 and 14

Polymerization was carried out in the same manner as in Example 9, except that monomer combinations were as shown in Table 13 and the continuous addition rate of monomer mixtures in forming the styrene-1,3-butadiene copolymer block was 1 g/minute. Physical properties of the copolymers obtained were as shown in Table 13.

Table 12

| Example No. | First stage monomer (g) | Second stage monomer (g) | | Third stage monomer (g) | | Forth stage monomer (g) | Fifth stage monomer (g) |
|---|---|---|---|---|---|---|---|
| 13 | Styrene 150 | Styrene | 50 | Styrene | 25 | Styrene 150 | — |
|    |             | 1,3-Butadiene | 50 | 1,3-Butadiene | 75 | | |
| 14 | Styrene 162.5 | Styrene | 32.5 | Styrene | 10 | Styrene 32.5 | Styrene 162.5 |
|    |             | 1,3-Butadiene | 30 | 1,3-Butadiene | 40 | 1,3-Butadiene 30 | |

Table 13

| Example No. | Intrinsic viscosity (dl/g) | Melt index (g/10 min.) | Tensile strength (kg/cm²) | Elongation (%) | Izod impact strength (unnotched) (kg·cm/cm²) | Clouding under bending stress (mm) |
|---|---|---|---|---|---|---|
| 13 | 0.71 | 0.70 | 236 | 343 | 68.1 | 4.2 |
| 14 | 0.81 | 0.17 | 309 | 173 | 34.1 | 5.6 |

COMPARATIVE EXAMPLES 5 to 7

Polymerization was carried out in the same manner as in Example 9, except that the mode of formation of styrene-1,3-butadiene copolymer block and of 1,3-butadiene homopolymer block was as shown in Table 14.

Table 14

| Comparative Example No. | First stage monomer (g) | | Second stage monomer (g) | | Third stage monomer (g) | Mode of forming styrene-1,3-butadiene copolymer block and 1,3-butadiene homopolymer block |
|---|---|---|---|---|---|---|
| 5 | Styrene | 400 | — | | — | In first stage, monomer mixture was continuously added over a period of 8 hours. |
|   | 1,3-Butadiene | 100 | | | | |
| 6 | Styrene | 200 | 1,3-Butadiene | 100 | Stryene 200 | In second stage, 1,3-butadiene was continuously added over a period of 2 hours. |
| 7 | Styrene | 150 | Styrene | 100 | Styrene 150 | In second stage, monomer mixture was added all |

Table 14-continued

| Comparative Example No. | First stage monomer (g) | Second stage monomer (g) | Third stage monomer (g) | Mode of forming styrene-1,3-butadiene copolymer block and 1,3-butadiene homopolymer block |
|---|---|---|---|---|
| | | 1,3-Butadiene 100 | | at a time. |

Physical properties of the polymers obtained were as shown in Table 15.

Table 15

| Comparative Example No. | Intrinsic viscosity (dl/g) | Melt index g/10 min.) | Tensile strength (kg/cm$^2$) | Elongation (%) | Izod impact strength (unnotched) (kg-cm/cm$^2$) | Clouding under bending stress (mm) |
|---|---|---|---|---|---|---|
| 5 | 0.86 | 1.14 | 1) | 391 | > 100 | 0 |
| 6 | 0.72 | 0.12 | 334 | 12 | 13.0 | Broken during |
| 7 | 0.85 | 0.07 | 310 | 45 | 15.5 | 22.0 |

Note:
1) Being elastomeric, no yield point was observed.

As is seen from Comapraative Example 5, a block copolymer which lacks in styrene homopolymer block has markedly low tensile strength. As is apparent from Comparative Examples 6 and 7, when the block in the second stage is formed from 1,3-butadiene alone or by adding a styrene-1,3-butadiene mixture all at a time, the block copolymer obtained becomes low in elongation and impact strength and becomes pronounced in clouding under bending stress.

What is claimed is:

1. In a process for producing a transparent block copolymer resin by block-copolymerizing 90 to 65 parts by weight of a vinyl aromatic compound monomer and 10 to 35 parts by weight of a conjugated diene monomer in a hydrocarbon solvent using an organolithium compound as initiator in the presence or absence of 0.01 to 5 mole-% based on the total monomer of a Lewis base compound to form a block copolymer in which each polymer molecule has at least one plastic region comprising a homopolymer of the vinyl aromatic compound and at least one elastomeric region comprising a random copolymer of the vinyl aromatic compound and the conjugated diene, the improvement which comprises forming said plastic region by homopolymerizing 50 to 90% by weight of the total vinyl aromatic compound monomer and said random copolymerized elastomeric region by adding continuously to the polymerization system a monomer mixture of a fixed composition, in which the weight ratio of the vinyl aromatic compound monomer to the conjugated diene monomer is 0.1 to 3.0, and under polymerization conditions at such a rate that the fed monomers will polymerize instantly and thus will not accumulate in the polymerization system, the resulting block copolymer having a mean molecular weight of 0.35 to 1.8 dl/g in terms of intrinsic viscosity as measured in toluene at 30° C.

2. A process according to claim 1, wherein the vinyl aromatic compound monomer is at least one member selected from the group consisting of styrene, α-methylstyrene and vinyltoluene.

3. A process according to claim 2, wherein the vinyl aromatic compound monomer is styrene.

4. A process according to claim 1, wherein the conjugated diene monomer is at least one member selected from the group consisting of 1,3-butadiene, isoprene and piperylene.

5. A process according to claim 4, wherein the conjugated diene monomer is 1,3-butadiene.

6. A process according to claim 1, wherein the hydrocarbon solvent is at least one member selected from the group consisting of aromatic, aliphatic and alicyclic hydrocarbons.

7. A process according to claim 6, wherein the hydrocarbon solvent is at least one member selected from the group consisting of hexane, heptane, cyclohexane, methylcyclohexane, benzene and toluene.

8. A process according to claim 1, wherein the inert hydrocarbon solvent is used in a proportion of 1 to 20 parts by weight per part by weight of the total monomer.

9. A process according to claim 1, wherein the Lewis base compound is an ether compound or a tertiary amine compound.

10. A process according to claim 9, wherein the ether compound is one member selected from the group consisting of cyclic ethers, aliphatic monoethers and aliphatic polyethers.

11. A process according to claim 10, wherein the ether compound is one member selected from the group consisting of tetrahydrofuran, tetrahydropyran, diethyl ether, dibutyl ether, ethylene glycol dimethyl ether and diethylene glycol diethyl ether.

12. A process according to claim 9, wherein the tertiary amine compound is one member selected from the group consisting of triethylamine, tripropylamine, tributylamine, N,N'-dimethylaniline and pyridine.

13. A process according to claim 1, wherein the Lewis base compound is used in a proportion of 0.01 to 5 mole-% based on the total monomer.

14. A process according to claim 1, wherein the Lewis base compound is not used.

15. A process according to claim 1, wherein the organolithium compound is an organomonolithium compound or an organodilithium compound.

16. A process according to claim 15, wherein the organo-monolithium compound is at least one member selected from the group consisting of ethyllithium, propyllithium, butyllithium, amyllithium, hexyllithium, 2-ethylhexyllithium, cyclohexyllithium, decyllithium, dodecyllithium, phenyllithium, tolyllithium, xylyllitium and naphthyllithium.

17. A process according to claim 16, wherein the organo-monolithium compound is butyllithium.

18. A process according to claim 15, wherein the organo-dilithium compound is at least one member selected from the group consisting of trimethylene-dilithium, tetramethylene-dilithium, pentamethylene-dilithium, naphthalene-lithium complex, stilbene-lithium complex, diphenyl-lithium complex, oligobutadienyl-dilithium and oligoisoprenyl-dilithium.

19. A process according to claim 18, wherein the organo-dilithium compound is one member selected from the group consisting of oligobutadienyl-dilithium and oligoisoprenyl-dilithium.

20. A process according to claim 1, wherein the organolithium compound is used in a proportion of 0.002 to 5 mole-% based on the total monomer.

21. A process accoeding to claim 1, wherein in forming two or more plastic regions composed of homopolymers of a vinyl aromatic compound, sum of the vinyl aromatic compound used in forming each plastic region is 50 to 90% by weight based on the total vinyl aromatic compound monomer.

22. A process according to claim 1, wherein in forming two or more elastomeric regions composed of random copolymers of a vinyl aromatic compound and a conjugated diene, the weight ratio of the vinyl aromatic compound to the conjugated diene used in forming each elastomeric region is in the range from 0.1 to 3.0 and the weight ratio of the vinyl aromatic compound to the conjugated diene used in forming all elastomeric regions is also in the range from 0.1 to 3.0.

23. A process according to claim 22, wherein in forming two or more elastomeric regions by continuous addition of the vinyl aromatic compound and the conjugated diene in a fixed ratio, said ratio is different among the elastomeric regions from one another.

24. A process according to claim 1, wherein the structure of the block copolymer to be formed is selected from the group consisting of
   (1) $S_1 - (S/B)_1$,
   (2) $S_1 - (S/B)_1 - S_1$,
   (3) $S_1 - (S/B)_1 - S_2$,
   (4) $S_1 - (S/B)_1 - (S/B)_2 - S_2$,
   (5) $S_1 - (S/B)_1 - S_2 - (S/B)_2$,
   (6) $S_1 - (S/B)_1 - (S/B)_2 - S_3$, and
   (7) $S_1 - (S/B)_1 - (S/B)_2 - (S/B)_1 - S_1$,
where $S_1$, $S_2$, and $S_3$ represent homopolymer regions of a vinyl aromatic compound and $(S/B)_1$ and $(S/B)_2$ represent random copolymer regions, formed by adding continuously to the polymerization system a monomer mixture of a fixed composition, in which the weight ratio of the vinyl aromatic compound monomer to the conjugated diene monomer is 0.1 to 3.0.

25. A process according to claim 1, wherein the polymerization is effected at a temperature in the range from 20° to 120° C.

26. A process according to claim 1, wherein, after completion of the polymerization, the polymerization mixture is contacted with excess of a lower alcohol, or directly heated to dryness, or mixed with steam, thereby removing the solvent to recover the polymer.

27. A block copolymer resin produced by the process according to claim 1.

* * * * *